Figure 1:
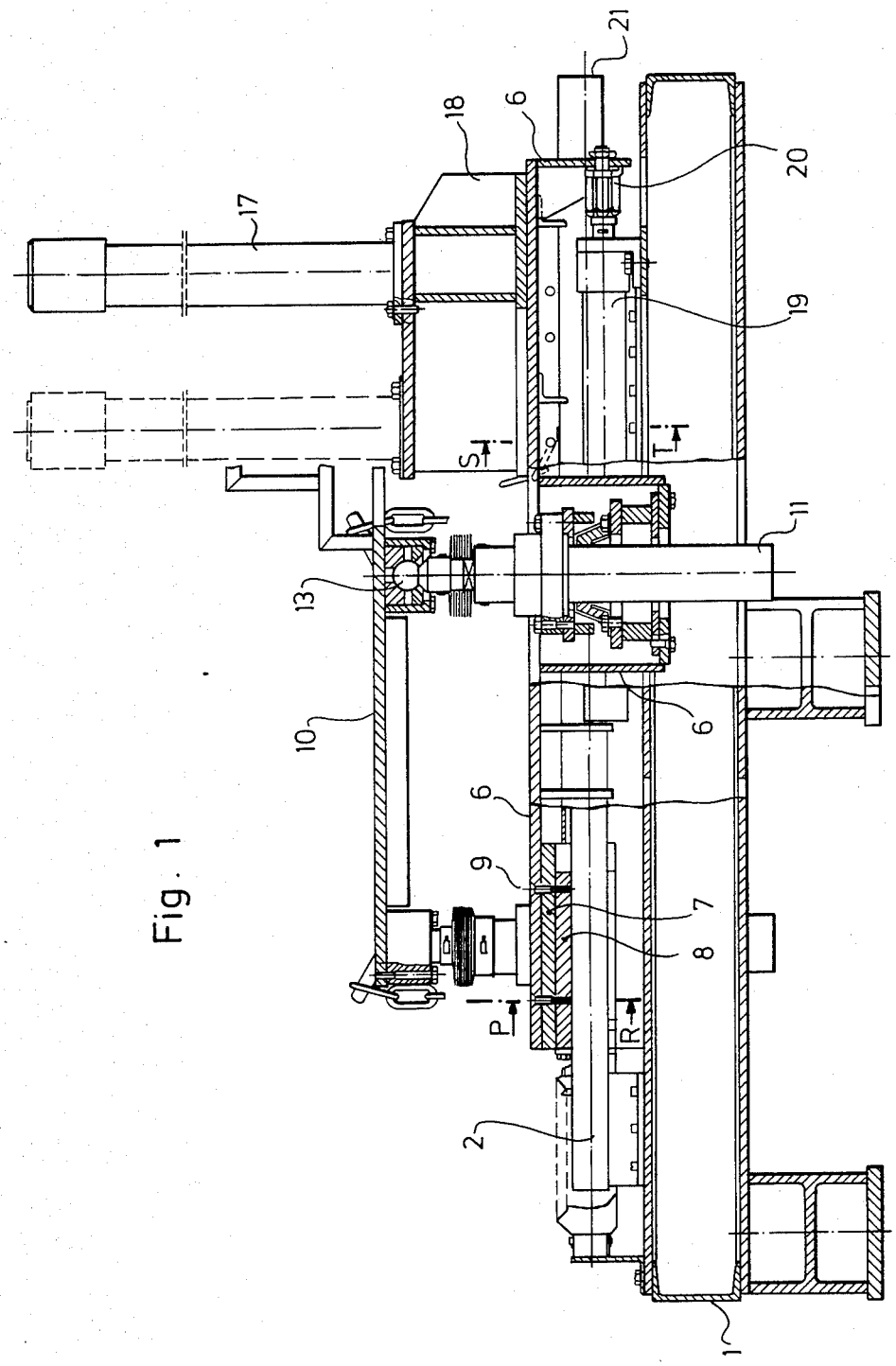

United States Patent [19]

Reinholdt et al.

[11] Patent Number: 4,492,134
[45] Date of Patent: Jan. 8, 1985

[54] APPARATUS FOR SCREWING PIPES TOGETHER

[75] Inventors: Bernd Reinholdt, Langenhagen; Hans-Christian Bock, Burgdorf, both of Fed. Rep. of Germany

[73] Assignee: Weatherford Oil Tool GmbH, Langenhagen, Fed. Rep. of Germany

[21] Appl. No.: 423,001

[22] Filed: Sep. 24, 1982

[30] Foreign Application Priority Data

Sep. 30, 1981 [DE] Fed. Rep. of Germany ....... 3138870

[51] Int. Cl.$^3$ .............................................. B25B 13/50
[52] U.S. Cl. .................................. 81/57.34; 81/57.16; 81/57.24; 81/57.35
[58] Field of Search ................. 81/57.16, 57.34, 57.35, 81/57.24, 57.25; 29/240; 269/45

[56] References Cited

U.S. PATENT DOCUMENTS

| | | | |
|---|---|---|---|
| 1,386,318 | 8/1921 | Cowan | 269/45 |
| 2,405,757 | 8/1946 | Rowland | 81/57.24 |
| 2,668,689 | 2/1954 | Cormany | 81/57.16 |
| 2,669,958 | 2/1954 | Sweeney | 269/45 |
| 3,722,603 | 3/1973 | Brown | 81/57.16 |

*Primary Examiner*—James L. Jones, Jr.
*Attorney, Agent, or Firm*—Peter K. Kontler

[57] ABSTRACT

A power tongs for threadedly connecting together pipes which are to constitute casings for boreholes has a platform for a reciprocable slide which supports a power-driven threading clamp and a counter device. The clamp and the counter device are connected to each other by several level compensating hydraulic cylinders each of which is movable horizontally within limits relative to the slide against the opposition of resilient support elements. The upper end portions of the cylinders are connected to a holding plate for the clamp.

7 Claims, 8 Drawing Figures

Section S-T

Section P-R

APPARATUS FOR SCREWING PIPES TOGETHER

The invention relates to an apparatus for screwing together pipes provided for the casing of an earth borehole, consisting of a power-driven screwing clamp and a counter-device connected to the clamp by way of resilient compensation elements.

In devices for screwing together pipes which after termination of the boring operation are drawn into the borehole for casing an earth bore, it is known to use a unit consisting of a screwing clamp and counter-device, which can be used either in a suspended execution, i.e. suspended on a cable, or in a stationary execution. Stationary executions are mainly used in the case of hydraulically raisable operating platforms.

During the screwing operation, relative movements arise between the screwing clamp and the associated counter-device caused by the progressive screwing or unscrewing and by motion which is not completely concentric. In order to compensate for these relative movements, spring elements, in particular spiral springs and air cushioning bellows, have been inserted between the clamp and counter-device up to the present time. However, such spring elements do not allow sufficiently uniform stressing when screwing together or unscrewing two pipes. During the screwing operation, the screw threads must be subjected to no or only slight additional loading, because they would thus become disadvantageously stressed, and would no longer be able to satisfy the requirements placed upon them, and in particular would no longer be able to ensure the required tightness between two pipes screwed into each other(arising due to a falsified torque).

The object of the invention is therefore to provide an apparatus of the initially described type, which can provide for the required satisfactory screwing-together of two pipes free from any loading by forces generated due to the relative movements between the clamp and the counter-device.

This object is attained according to the invention in that hydraulic operating cylinders are provided as compensation elements between the screwing clamp and the counter-device. By this means, in contrast to the previously used spring compensation elements, it is possible to screw together two pipes without any undesirable additional stressing during the screwing operation. Any occurring transverse relative movements, which cannot be completely prevented, can be compensated by resilient support elements in which the operating cylinders are supported. In addition, the operating cylinders are fitted with ball-and-socket joints at their force transfer points.

In order to satisfy the requirement of immediate access to the pipe run, the total apparatus together with the counter-uprights can be supported on a slide, which is slidably disposed on a platform.

A particular advantage is the possibility of connecting to a common hydraulic supply apparatus the operating cylinder together with the clamp, counter-device and mobile slide, which is likewise hydraulically slidable.

Further characteristics pertaining to advantageous developments of the invention are apparent from the dependent claims.

Figure 2:
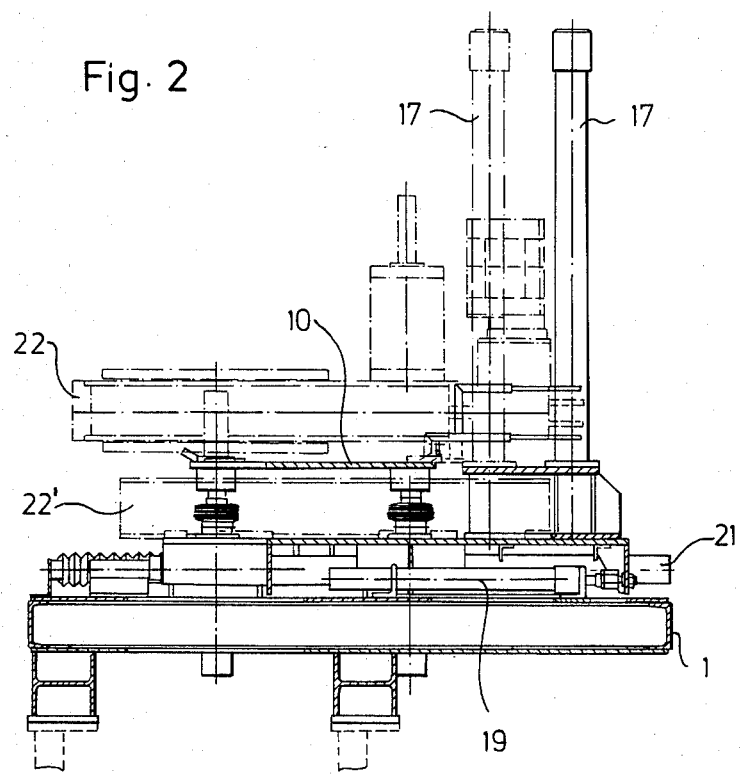
Figure 3:
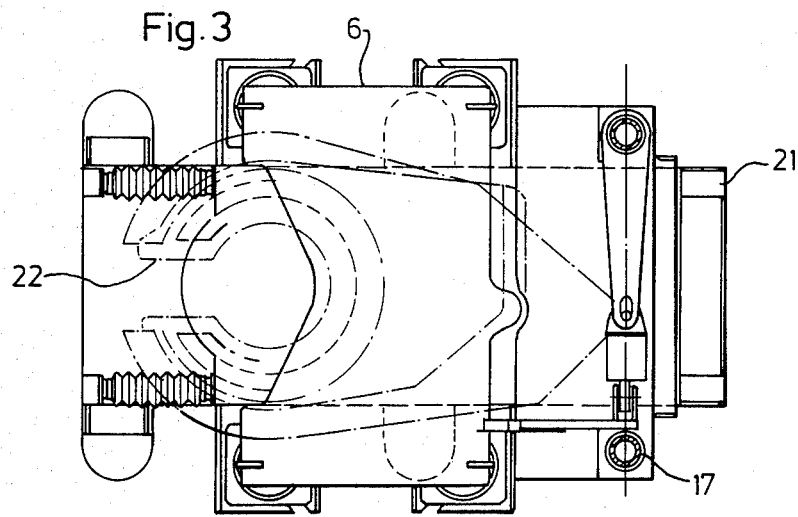
Figure 4:
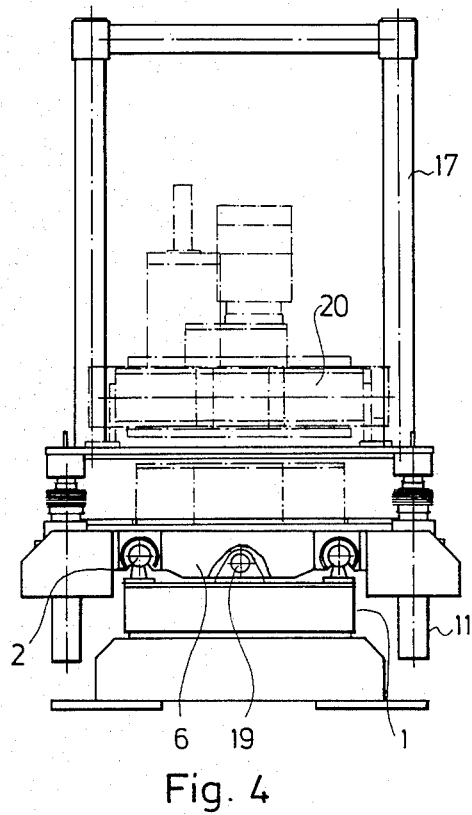
Figure 5:
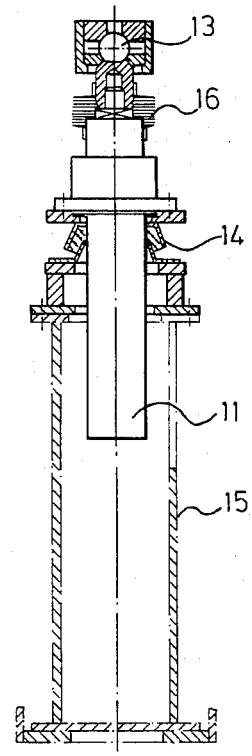
Figure 6:
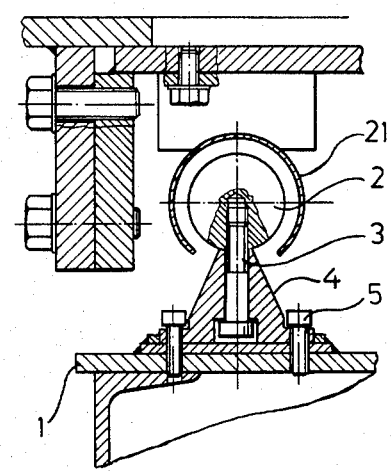
Figure 7:
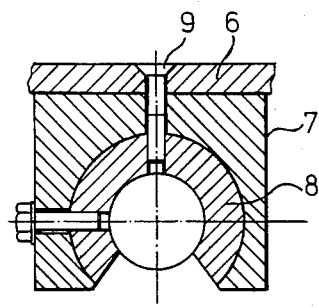
Figure 8:
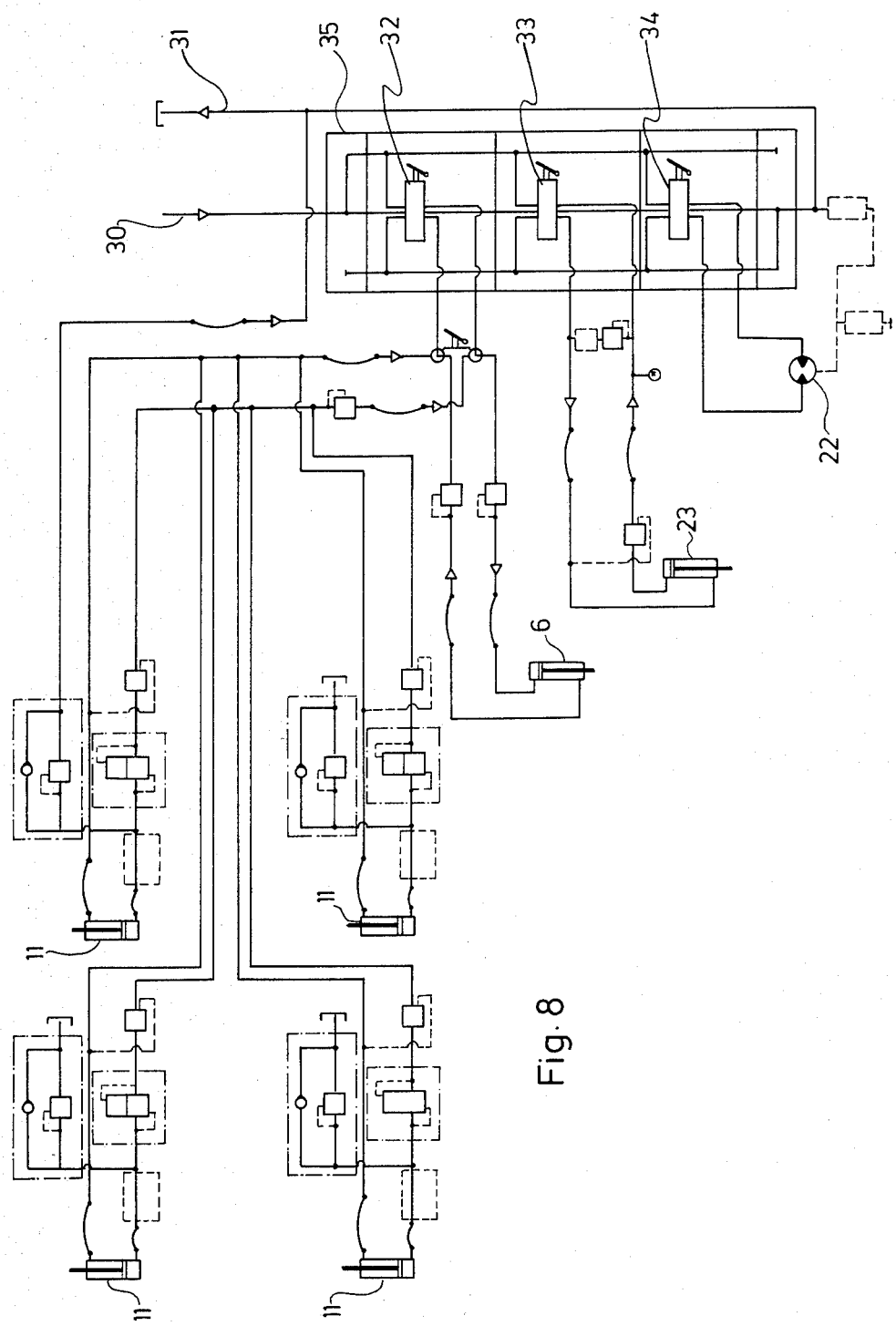

The drawing shows a diagrammatic illustration of one embodiment of the invention, which is described hereinafter. In the drawing:

FIG. 1 is a vertical longitudinal section through the platform, the slide and the operating cylinders, but with the clamp and counter-device removed, FIG. 2 is a further vertical section showing the clamp in two different operating planes, FIG. 3 is a plan view of the apparatus of FIG. 2, FIG. 4 is an end view of the apparatus of FIG. 2, FIG. 5 is a longitudinal section through an operating cylinder, FIG. 6 is a cross-section through a slide rail, FIG. 7 is a cross-section through a split bearing section of a slide runner, and FIG. 8 shows the hydraulic circuit.

Slide rails 2 are disposed on a platform 1 of box-shaped cross-section, and are connected by screws 3 to rail carriers 4. The rail carriers are likewise screwed to the platform 1 by screws 5.

A slide 6 is carried by the rails 2, and is slidable on the rails with the aid of slide guides 7. The slide guides include split bearing sections 8 which surround the rails 2 and are held in the slide guides by screws 9.

Four hydraulic operating cylinders 11 are disposed on the counter-device, not shown, between the holding plate 10 for the screwing clamp, not shown, and the slide 6. The operating cylinders are connected to the holding plate 10 for the screwing clamp by way of ball-and-socket joints 13, while in order to compensate for relative movements transverse to the sliding direction of their hydraulic pistons, they are supported in resilient elements 14. If required, spacer cylinders 15 can be inserted between the lower support for the operating cylinder and the slide in order to overcome larger differences. The outlet of the piston rod from the operating cylinder is sealed by means of a bellows 16.

Not only the screwing clamp and the counter-device, but also the counter-uprights 17 are rigidly fixed to the slide 6 by means of plate-like supports 18. The slide itself is slidable with the aid of a hydraulic cylinder 19, which is connected to the middle of the slide by way of a flexible coupling 20.

FIGS. 2 to 4 show the screwing clamp 22, and in addition FIG. 2 shows its lowest position, indicated by 22'.

The slide rails 2 are partly enclosed by protection pipes 21. The hydraulic circuit of FIG. 8 shows a common feed 30 and a common return 31 for operating the screwing clamp 22, the hydraulic cylinder for the counter-device 23, the hydraulic cylinder for the slide 6 and the hydraulic operating cylinders 11 for compensating the difference in height between the screwing clamp and the counter-device. The corresponding control devices 32, 33, 34 for the operating cylinder 11 of the screwing clamp, for the slide cylinder 19, for the counter-device and for the screwing clamp are combined into a common unit, as shown by means of the border line 35.

During a screwing or unscrewing operation, the screwing clamp 22 resting on the holding plate 10 is adjusted in relation to the slide 6 and thus to the counter-device. The varying distance is compensated by the operating cylinders 11. Because of the fact that a screwing operation cannot be carried out absolutely concentrically due to unavoidable tolerances, transverse movements arise which should likewise be compensated. This is done by means of the resilient compensation elements 14, by means of which the hydraulic cylinders 11 are connected to the slide 6.

When free access to the pipe run becomes necessary, the hydraulic operating cylinder 19 for the slide 6 is operated, by which means this latter together with the screwing clamp, the counter-device and counter-uprights are moved in such a manner that a sufficient gap in the direction of the pipe run is obtained. A complicated swinging-out operation, as was previously necessary in the case of suspended clamps and counter-devices, is thus avoidable. The total apparatus in its illustrated compact construction can be installed on an operating platform for pipe casing work.

We claim:

1. Apparatus for screwing together pipes provided for the casing of boreholes, comprising a support; a slide movably mounted on said support; a power-driven screwing clamp on said slide; a counter device on said slide; and level compensating means connecting said clamp to said counter device, including a plurality of hydraulic operating cylinders.

2. The apparatus of claim 1, wherein said cylinders are movable within limits substantially horizontally relative to said slide and further comprising resilient support elements interposed between said cylinders and said slide.

3. The apparatus of claim 1, further comprising a holding member for said clamp and ball and socket joints connecting said cylinders to said holding member.

4. The apparatus of claim 1, wherein said counter device comprises uprights rigidly connected to said slide.

5. The apparatus of claim 1, further comprising guide rails for said slide and means for securing said guide rails to said support.

6. The apparatus of claim 1, wherein said clamp and said counter device comprise hydraulic components and further comprising hydraulic motor means for moving said slide relative to said support and a common hydraulic supply unit for said components, said motor and said cylinders.

7. The apparatus of claim 1, further comprising automatic level regulating means for all of said cylinders.

* * * * *